(12) United States Patent  
Karr et al.

(10) Patent No.: US 8,824,100 B2
(45) Date of Patent: Sep. 2, 2014

(54) OVERCOATS THAT INCLUDE MAGNETIC MATERIALS

(75) Inventors: Brian William Karr, Savage, MN (US); Joel William Hoehn, Hudson, WI (US); Declan Macken, Prior Lake, MN (US); Christopher Loren Platt, Fremont, CA (US); Mei-Ling Wu, San Jose, CA (US); Sarbeswar Sahoo, Shakopee, MN (US); Michael Christopher Kautzky, Eagan, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/476,226

(22) Filed: May 21, 2012

(65) Prior Publication Data

US 2013/0128385 A1 May 23, 2013

Related U.S. Application Data

(60) Provisional application No. 61/488,411, filed on May 20, 2011.

(51) Int. Cl.
*G11B 5/187* (2006.01)
*G11B 5/31* (2006.01)
*G11B 5/127* (2006.01)
*G11B 5/00* (2006.01)

(52) U.S. Cl.
CPC .............. *G11B 5/127* (2013.01); *G11B 5/3146* (2013.01); *G11B 2005/0021* (2013.01)
USPC .......................................... 360/122

(58) Field of Classification Search
USPC .............. 360/235.7, 235.8, 236.3, 236.5, 122
See application file for complete search history.

(56) References Cited

U.S. PATENT DOCUMENTS

| | | | | | |
|---|---|---|---|---|---|
| 3,566,045 | A | * | 2/1971 | Kern | 360/122 |
| 4,788,612 | A | * | 11/1988 | Perlov | 360/119.11 |
| 5,050,027 | A | * | 9/1991 | Meunier et al. | 360/122 |
| 5,189,572 | A | * | 2/1993 | Gooch | 360/77.12 |
| 6,229,669 | B1 | * | 5/2001 | Beck et al. | 360/122 |
| 6,470,565 | B1 | * | 10/2002 | Sasaki | 29/603.12 |
| 6,747,841 | B1 | | 6/2004 | Olim | |
| 6,992,870 | B2 | * | 1/2006 | Kagami et al. | 360/324.2 |
| 7,057,859 | B2 | * | 6/2006 | Kagami et al. | 360/317 |
| 7,137,190 | B2 | * | 11/2006 | Hsiao et al. | 29/603.08 |
| 7,177,117 | B1 | * | 2/2007 | Jiang et al. | 360/125.12 |
| 7,207,100 | B2 | * | 4/2007 | Kagami et al. | 29/603.16 |
| 7,308,751 | B2 | * | 12/2007 | Kagami et al. | 29/603.07 |
| 7,312,961 | B2 | * | 12/2007 | Kagami et al. | 360/324.2 |
| 7,522,377 | B1 | * | 4/2009 | Jiang et al. | 360/125.12 |
| 7,656,619 | B1 | | 2/2010 | Yan | |
| 8,035,929 | B2 | * | 10/2011 | Kawakita et al. | 360/315 |
| 8,114,470 | B2 | | 2/2012 | Gao | |
| 2008/0204938 | A1 | | 8/2008 | Hirata | |

* cited by examiner

Primary Examiner — Angel Castro
(74) Attorney, Agent, or Firm — Mueting, Raasch & Gebhardt P.A.

(57) ABSTRACT

A device having an air bearing surface, the device including a writer portion having an air bearing surface at the air bearing surface of the device; and an overcoat layer disposed on at least a portion of the air bearing surface of the writer portion, wherein the overcoat includes a material having a magnetic moment of at least about 0.1 Tesla (T).

21 Claims, 7 Drawing Sheets

OVERCOATS THAT INCLUDE MAGNETIC MATERIALS

PRIORITY

This application claims priority to U.S. Provisional Application No. 61/488,411, entitled "MAGNETIC OVERCOATS" filed on May 20, 2011, the entire disclosure of which is hereby incorporated by reference thereto.

BACKGROUND

Typically, magnetic transducers include overcoat layers that are made of materials that are chosen to provide corrosion protection and tribological enhancement to the transducer and ABS. Typical materials that are utilized are carbon based materials because of their tribological properties and their ability to prevent galvanic corrosion of the magnetoresistive elements and writer materials. Materials, such as carbon based materials are very effective, but they lead to an increase in head-media spacing. Therefore, there remains a solution that provides overcoat properties but does not increase the head-media spacing.

SUMMARY

A device having an air bearing surface, the device including a writer portion having an air bearing surface at the air bearing surface of the device; and an overcoat layer disposed on at least a portion of the air bearing surface of the writer portion, wherein the overcoat includes a material having a magnetic moment of at least about 0.1 Tesla (T).

A system that includes a device having an air bearing surface, the device including a writer portion having an air bearing surface at the air bearing surface of the device; and a head overcoat layer disposed on at least a portion of the air bearing surface of the writer portion, wherein the overcoat includes a material having a magnetic moment of at least about 0.1 Tesla (T); and magnetic media, the magnetic media including a media overcoat layer, the media overcoat layer including a material having a magnetic moment of at least about 0.1 Tesla (T).

These and various other features and advantages will be apparent from a reading of the following detailed description.

BRIEF DESCRIPTION OF THE FIGURES

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying set of drawings that form a part hereof and in which are shown by way of illustration several specific embodiments. It is to be understood that other embodiments are contemplated and may be made without departing from the scope or spirit of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

"Include," "including," or like terms means encompassing but not limited to, that is, including and not exclusive. It should be noted that "top" and "bottom" (or other terms like "upper" and "lower") are utilized strictly for relative descriptions and do not imply any overall orientation of the article in which the described element is located.

Figure 1:
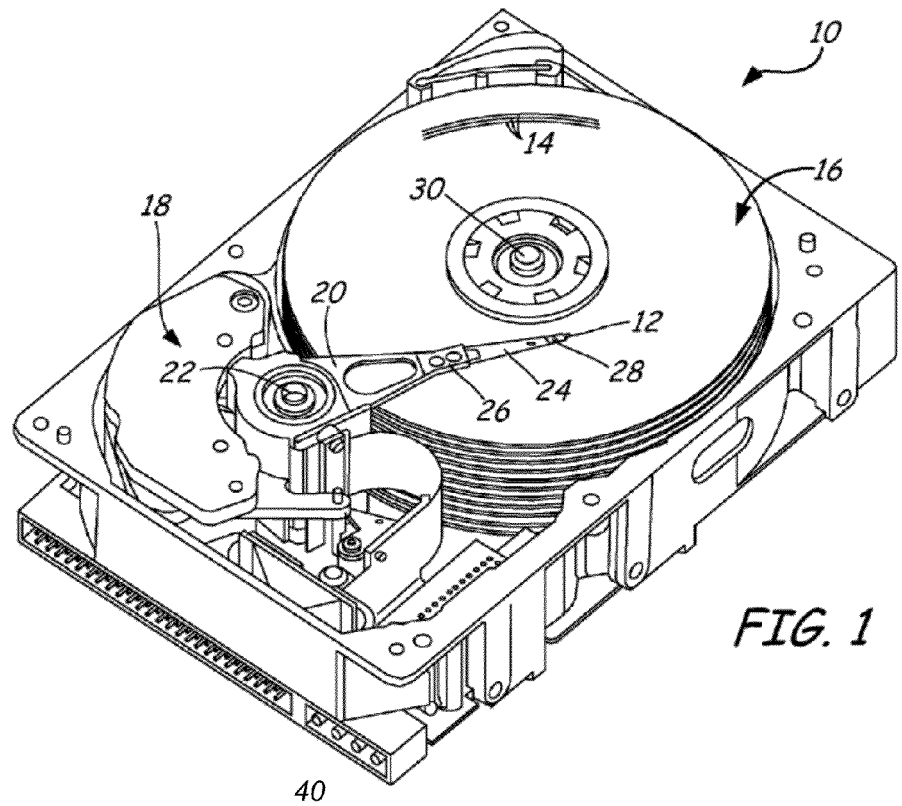
FIG. 1 is a perspective view of a magnetic disc drive that can include HAMR devices.

FIG. 1 is a perspective view of disc drive 10 including an actuation system for positioning slider 12 over track 14 of magnetic medium 16. The particular configuration of disc drive 10 is shown for ease of description and is not intended to limit the scope of the present disclosure in any way. Disc drive 10 includes voice coil motor 18 arranged to rotate actuator arm 20 on a spindle around axis 22. Load beam 24 is connected to actuator arm 20 at head mounting block 26. Suspension 28 is connected to an end of load beam 24 and slider 12 is attached to suspension 28. Magnetic medium 16 rotates around an axis 30, so that the windage is encountered by slider 12 to keep it aloft a small distance above the surface of magnetic medium 16. Each track 14 of magnetic medium 16 is formatted with an array of data storage cells for storing data. Slider 12 carries a magnetic device or transducer (not shown in FIG. 1) for reading and/or writing data on tracks 14 of magnetic medium 16. In some embodiments, the magnetic transducer can utilize additional electromagnetic energy to heat the surface of medium 16 to facilitate recording by a process termed heat assisted magnetic recording (HAMR).

Figure 2:
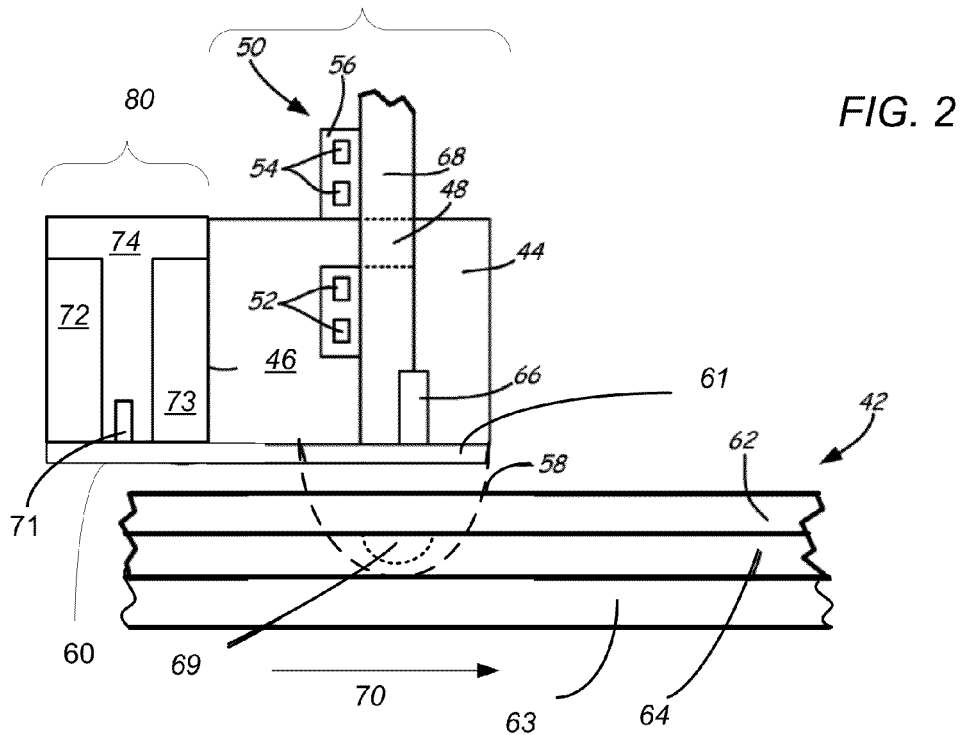
FIG. 2 is a cross sectional view of a perpendicular magnetic recording head and of an associated recording medium.

A transducer includes a magnetic writer for generating a magnetic field to write to a magnetic medium (e.g. magnetic medium 16). A HAMR transducer can include the magnetic writer and an optical device to heat a portion of the magnetic medium proximate to the write field. FIG. 2 is a cross sectional view of a portion of a magnetic device. The specific device shown in FIG. 2 is a HAMR magnetic device, but it should be understood that embodiments disclosed herein can be utilized with HAMR transducers as well as non-HAMR transducers. The device in FIG. 2 however, for example, is a HAMR magnetic device and a portion of associated magnetic storage medium 42. The HAMR magnetic device includes a write portion 40 that can include write pole 44 and return pole 46 coupled by pedestal 48. Coil 50 comprising conductors 52 and 54 encircles the pedestal and is supported by an insulator 56. As shown, magnetic storage medium 42 is a perpendicular magnetic medium comprising media overcoat layer 62, magnetically hard storage layer 64 and soft magnetic underlayer 63 but can include other layers (for example, a lubricant layer can be on the media overcoat layer 62). It is also understood that the magnetic storage medium can also be other forms of media, such as patterned media. A current in the coil 50 induces a magnetic field in the pedestal 48 and the poles. Magnetic flux 58 exits the recording head at air bearing surface (ABS) 60 which is coated with head overcoat layer 61, and is used to change the magnetization of portions of magnetically hard layer 64 of storage medium 42 enclosed within region 58. As seen in FIG. 2, the head overcoat layer 61 covers substantially all of the air bearing surface of the writer portion (however it should be noted that it could cover less than substantially all of the air bearing surface of the writer portion). The disclosures of U.S. Pat. No. 8,114,470, entitled "REDUCED SPACING RECORDING APPARATUS", issued on Feb. 14, 2012, and the continuing application thereof, U.S. patent application Ser. No. 13/372,398, filed on Feb. 13, 2012, are hereby incorporated herein by reference thereto.

In HAMR transducers, near field transducer 66 is positioned adjacent the write pole 44 proximate air bearing surface 60. Near field transducer 66 is coupled to waveguide 68 that receives an electromagnetic wave from an energy source such as a laser. An electric field at the end of near field transducer 66 is used to heat a portion 69 of magnetically hard layer 62 to lower the coercivity so that the magnetic field from the write pole 44 can affect the magnetization of the storage medium.

The magnetic device in FIG. 2 also includes a reader portion 80. The reader portion 80 can include a read element 71, a top read shield 72, a bottom read shield 73, and a read structure insulation portion 74. As seen in this particular embodiment, the head overcoat layer 61 is configured to cover substantially all of air bearing surface of the reader portion as well (but it should be noted that it could cover less than substantially all of the air bearing surface of the reader portion).

Since the magnetic field from the media (which is detected by the magnetoresistive element) and the magnetic field from the writer (which changes the magnetic state of the media) decays rapidly, any increase in the distance from magnetic material to magnetic material, which is termed "magnetic spacing", can detrimentally affect writeability and readability of the recording system. For example, given a point source of a magnetic field, the decay in the field is roughly inversely proportional to the square of the distance. In some embodiments, one or both of the writer overcoat layer 61 and the media overcoat layer 62 can include materials that are at least somewhat magnetic. Use of such materials can minimize the amount of magnetic dead space between the transducer and the magnetic media.

The particular materials that may be utilized as overcoats can be chosen by considering a number of properties. The properties that may be considered can include magnetic properties, electrical properties, corrosion properties, physical properties, wear resistant properties, and in some embodiments, optical properties. When choosing an appropriate material for an overcoat, one or more than one of these properties (and/or properties not discussed herein) can be considered.

Magnetic properties that may be considered can include, for example, magnetic moment, coercivity, anisotropy, and coupling. In some embodiments, the magnetic moment of a material can be considered when determining whether or not the material could be used as an overcoat material. Generally, materials with magnetic moments that are higher can be better than materials with magnetic moments that are lower. Materials with higher magnetic moments can produce devices that have higher read back amplitude because the magnetic spacing is lower. In some embodiments, materials that have magnetic moments of at least about 0.05 Tesla (T) can be utilized. In some embodiments, materials that have magnetic moments of at least about 0.1 T can be utilized. In some embodiments, materials that have magnetic moments of at least about 0.5 T can be utilized. In some embodiments, materials that have magnetic moments of at least about 0.75 T can be utilized. In some embodiments, materials that have magnetic moments of at least about 1.0 T can be utilized.

Coercivity of a material can, but need not, also be considered. In some embodiments, a material whose coercivity is similar to the underlying layer can be utilized. In some embodiments, a material whose coercivity is relatively high may promote write and possible read back gradients. In some embodiments, materials that have a coercivity of at least about 100 Oersted (Oe) can be utilized. In some embodiments, materials that have a coercivity of at least about 200 Oe can be utilized.

The anisotropy of the material can, but need not, also be considered. In some embodiments, the material can have or be formed to have perpendicular anisotropy. In some embodiments, materials with perpendicular anisotropy can reduce the magneto-static energy of the device.

The ability of the material to couple to the magnetic media can, but need not, also be considered. In some embodiments, the material can be capable of ferromagnetically coupling to the magnetic media. Materials that can magnetically couple to the magnetic media can further decrease the magnetic spacing of the device to the magnetic media.

The material that is chosen may also be chosen to be magnetically hard enough, such that the shields do not impact the transducer magnetic alignment.

Electrical properties that may be considered are electrical resistivity (or conversely electrical conductivity). In some embodiments, a material that is considered electrically insulating can be utilized. Materials that are not electrically insulating could cause shunting of current along the ABS in either current in the plane (CIP) or current perpendicular to the plane (CPP) configurations. If shunting occurs, the sense current is reduced, making it harder to read the state of the magnetic device (i.e., read the data in the magnetic media). In some embodiments, materials that have an electrical resistance of at least about $6\times10^{-8}$ $\Omega$m can be utilized.

Corrosion properties of materials may also be considered. For example, the corrosion potential of a material may be considered. The corrosion potential (and/or other corrosion related properties) can be important because the overcoat should be able to protect the underlying materials and structures from corrosion that may occur during normal wear and tear of the device. In some embodiments, the corrosion potential at both acidic and neutral conditions can be considered, while in other embodiments, only the corrosion potential at one or the other (acidic or neutral conditions) can be considered. In some embodiments, materials that have corrosion potentials of about 0.0 to −0.1 V in an acidic solution (pH 3.0) can be utilized. In some embodiments, materials that have corrosion potentials of at least about −0.2 V in a neutral solution can be utilized. In some embodiments, materials that have corrosion potentials of about 0.0 to −0.1 V in an acidic solution (pH 3.0) and at least about −0.2 V in a neutral solution can be utilized.

Physical properties of overcoats, or materials making up the overcoat that may be considered include, for example, thickness, roughness, density, granular structure, and adhesion for example. In some embodiments, overcoats can have thicknesses of at least about 15 Å. In some embodiments, overcoats can have thicknesses of at least about 20 Å. In some embodiments, overcoats can have thicknesses of not greater than about 25 Å. In some embodiments, overcoats can have thicknesses from about 15 Å to about 25 Å. In some embodiments, the roughness of an overcoat can range from about 0 Å Ra (1 µm×1 µm scan) to about 2 Å Ra. In some embodiments, the roughness can be lower than the roughness of the magnetic media to advantageously contribute to coverage and hydrophobicity of the overcoat. In some embodiments, the density of the overcoat can range from about 1.9 to about 2.1 g/cc. In some embodiments, the granular structure of the overcoat material can be the same as that of the underlying media material. In some embodiments, the material of the overcoat layer can be chosen to have good adhesion to the underlying material, and in some embodiments promote good adhesion to the material over it (i.e., a lubricating layer in the case of the media overcoat layer). The material for the overcoat layer can also be chosen to be resistant to wear.

In some embodiments, for example embodiments where the device is a HAMR device, optical properties of the material may also be relevant. In some embodiments, materials that have optical properties that are at least as good as diamond like carbon (DLC) can be utilized. Optical properties that can be considered can include, for example the refractive index (n) and the extinction coefficient (κ). It is generally desirable that the refractive index be relatively large and the extinction coefficient be relatively small. In some embodiments, the refractive index can be at least as high as that of DLC. The refractive index of DLC can range from about 2.095 to about 2.18. In some embodiments, a material having an index of refraction of at least about 2.09 may be utilized. In some embodiments, the extinction coefficient can be no higher than that of DLC. The extinction coefficient of DLC is about 0, and in some embodiments can be from about 0.01 to about 0.08. In some embodiments, a material having an extinction coefficient of less than about 0.1 can be utilized. In some embodiments, a material having an extinction coefficient of less than about 0.08 can be utilized.

There are many exemplary materials that may be utilized in overcoats, as disclosed herein. It should also be noted that some materials or mixtures of materials can be characterized in more than one fashion, i.e., a single material or mixture could fit into more than one class, as they are described herein. Exemplary materials can include, for example, mixtures of ferromagnetic material and insulating materials; semiconductors doped with magnetic materials; ferrites; two phase materials; atomic level bilayers or multilayers; graded layers of materials; partially oxidized ferromagnetic materials or ferrimagnetic materials; and exotic materials, for example.

One class of materials that can be utilized as overcoats includes mixtures of ferromagnetic materials and insulating materials. There are two subclasses of such materials mixtures of ferromagnetic materials and oxides and mixtures of ferromagnetic materials and de-couple grains. Specific types of mixtures of ferromagnetic materials and oxides can include, for example, cobalt (Co) doped titanium oxide (TiO), and iron cobalt (FeCo) doped yttrium oxide ($Y_2O_3$). Specific types of mixtures of ferromagnetic materials and de-coupled grains can include, for example, cobalt platinum (CoPt) doped carbon (C), silicon dioxide ($SiO_2$), and alumina ($Al_2O_3$).

Another class of materials that can be utilized as overcoats includes semiconductors doped with magnetic materials. Specific types of such materials can include, for example, cobalt (Co), nickel (Ni), iron (Fe), or chromium (Cr) doped titanium oxide ($TiO_x$); Co or manganese (Mn) doped zinc oxide (ZnO); Fe or Mn doped tin oxide ($SnO_x$); Fe or Mn doped indium oxide ($In_2O_3$), chromium oxide ($CrO_2$), or europium oxide (EuO); and magnetic nitrides such as chromium aluminum nitride (CrAlN), gallium chromium nitride (GaCrN), gallium vanadium nitride (GaVN), and indium vanadium nitride (InVN). In some embodiments, materials of this class that could that would be used would have relatively high coercivity in order to be magnetically hard.

Another class of materials that can be utilized as overcoats includes ferrites. Specific types of such materials can include, for example, barium ferrites ($BaFe_xO_y$) such as $BaFe_{12}O_{19}$, strontium ferrites ($SrFe_xO_y$), and cobalt ferrites ($CoFe_xO_y$). In some embodiments, strontium ferrites ($SrFe_xO_y$) can be utilized in overcoats as disclosed herein.

Another class of materials that can be utilized as overcoats includes two phase materials. Two phase materials can include, for example, ferromagnet/insulator materials or paramagnet/insulator materials. Specific types of such materials can include, for example, cobalt (Co), iron (Fe), nickel (Ni) or their alloys dispersed in an alumina ($Al_2O_3$), silica ($SiO_2$), or carbon (C) matrix.

Another class of materials that can be utilized as overcoats includes atomic level bilayers or multilayers. The bilayers or multilayers can include both ferromagnet material/insulator material and paramagnet material/insulator material. Specific types of such materials can include, for example, atomic level bilayers or multilayers of cobalt (Co), iron (Fe), or nickel (Ni) with alumina ($Al_2O_3$), silica ($SiO_2$) or carbon (C).

Another class of materials that can be utilized as overcoats includes graded layers. Specific types of such materials can include, for example, graded layers of cobalt (Co), iron (Fe), or nickel (Ni) with alumina ($Al_2O_3$), silica ($SiO_2$) or carbon (C).

Another class of materials that can be utilized as overcoats includes partially oxidized ferromagnetic or ferrimagnetic materials. Specific types of such materials can include, for example, FeCoO, and $Fe_xO_y$. In some embodiments, materials of this class that could that would be used would have relatively high Curie temperature (Tc) in order to be magnetically hard.

Another class of materials that can be utilized as overcoats includes exotic materials. Specific types of such materials can include, for example, manganese (Mn) doped indium antimony (InSb), and cobalt (Co) doped titanium antimony (TiSb). In some embodiments, materials of this class that could that would be used would have relatively high Curie temperature (Tc), for example at least about 400° C.

Also disclosed herein are overcoats that can be formed by deposition of a metal layer (via chemical vapor deposition or atomic layer deposition for example) followed by oxidation in order to produce a ferromagnetic/ferrimagnetic oxide. Types of oxidation that can be utilized herein can include, for example, natural oxidation, radical shower oxidation, ultraviolet (UV) light assisted oxidation, ion beam oxidation, or oxygen plasma oxidation. In some embodiments where an atomic layer deposition process is utilized, a stoichiometric oxide can be formed using a precursor, which can provide a metal cation, and another precursor, which provides an oxygen anion.

Specific materials that can be utilized herein can include, for example, $BaFe_{12}O_{19}$, $CrO_2$, $\gamma$-$Fe_2O_3$, $CoFe_2O_4$ and $Fe_3O_4$. Multilayers or composites including such materials can be utilized. In addition, Fe, Co or Ni may be added to the multilayers or composites in order to affect the magnetic properties of the overcoat material. Ferromagnetic epitaxial growth layers may also be used to obtain a desired oxide phase, while still maintaining magnetic exchange to the underlying head or media layer. A carbon layer may also be modified to make it more magnetically permeable by the addition of Fe, Co, Ni, or a combination thereof for example.

In some embodiments, an overcoat layer can include a single layer of ferromagnetic/ferrimagnetic material, however, multilayers of ferromagnetic/ferrimagnetic structures can also be utilized. Such structures could include structures which have three layers (or even more) where two ferromagnetic/ferrimagnetic layers are exchange coupled through a non-magnetic material (ruthenium, Ru, for example). These layers could have anisotropy in the plane of the sample or could have anisotropy out of the plane. Other alternatives for materials can include CoCr, CoNi, and FeCr for example. In some embodiments, overcoats (either over the writer portion, the reader portion, or a combination thereof) can be made of any such materials disclosed herein, including, for example $CrO_2$, $EuO$, and $Fe_3O_4$.

EXAMPLES

Example 1

One alternative material for an overcoat layer includes an oxidized layer of $Fe_{50}Co_{50}$. These examples show exemplary methods of producing such a layer and various properties of such a material.

A thin layer (2 nm) of $Fe_{50}Co_{50}$ was deposited by magnetron sputtering. The layer was then exposed to ambient atmosphere or to oxygen produced by an electron-cyclotron resonance (ECR) plasma in-situ for a set exposure time. The corrosion potential of the resulting $FeCoO_x$ film was measured and found to be between 0 and −70 mV. It had a corrosion current of about $10^{-7}$ A. Nanoscratch indentation tests were favorable in comparison to sputtered carbon overcoats. The magnetic moment of the $FeCoO_x$ material was difficult to measure precisely, but has been reported in the literature to be as large as 500 emu/cc (for FeCo exposed in-situ to ambient oxygen).

Samples of two types were formed: 1.) $Fe_{50}Co_{50}$ sputtered thick (roughly 25 nm); and 2.) Fe50Co50 thin (15 nm) on a cobalt (Co) underlayer, to simulated a head or magnetic media material. The type 1 samples were oxidized both by exposure to ambient atmosphere and by in-situ exposure to ECR oxygen plasma. Corrosion testing and evaluation was done using both electrochemical testing and x-ray photoelectron spectroscopy (XPS). Wear resistance was evaluated by nano-indentation with an atomic force microscope (AFM).

Figure 3:
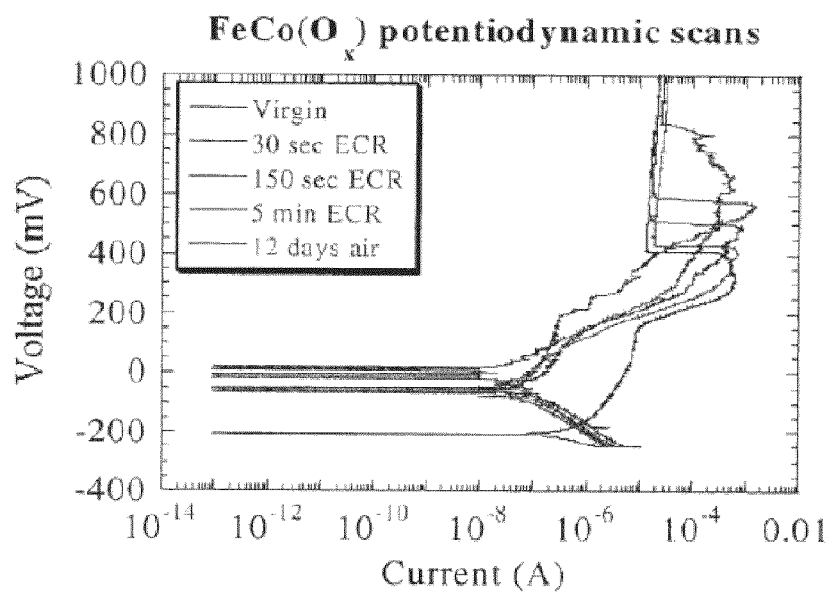
FIG. 3 shows potentiodynamic scans (in 0.1 M NaCl solution) of $Fe_{50}Co_{50}$ films that were subjected to various oxidation conditions.

FIG. 3 shows the potentiodynamic scans taken on $Fe_{50}Co_{50}$ films oxidized by various means and oxidation times. Extended oxidation times and/or aggressive oxidation (ECR) can produce oxide films that are quite thick (>4 nm). The thickness of the oxide can be controlled by exposure conditions and duration. A virgin curve is also shown which illustrates the reactive nature of a bare $Fe_{50}Co_{50}$ film that was tested immediately after removal from the vacuum chamber. In the anodic portion of the potentiodynamic curve, classic passivation character was noted. Some of the oxidation treatments resulted in films that still showed some tendency to passivate for applied voltages above the open circuit potential (OCP). Others, like the 12 day exposure, resulted in plots more characteristic of diffusion limited behavior.

Figure 4:
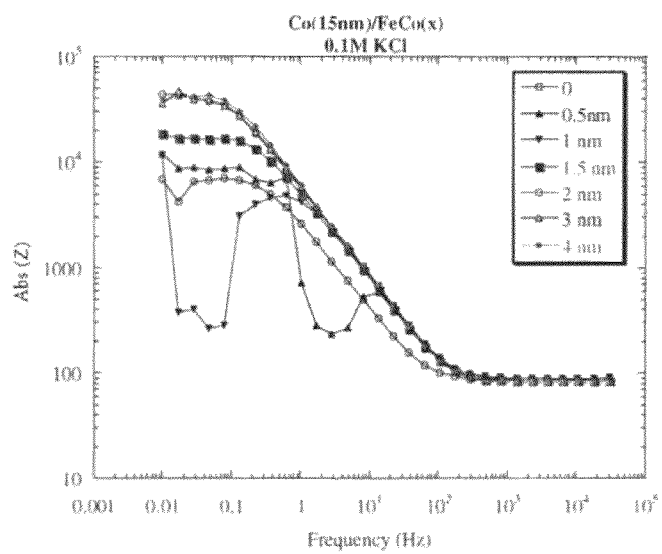
FIG. 4 are Bode frequency plots of electrochemical impedance spectroscopy (EIS) spectra of various $Fe_{50}Co_{50}$ films in 0.1 M KCl solution.
Figure 5:
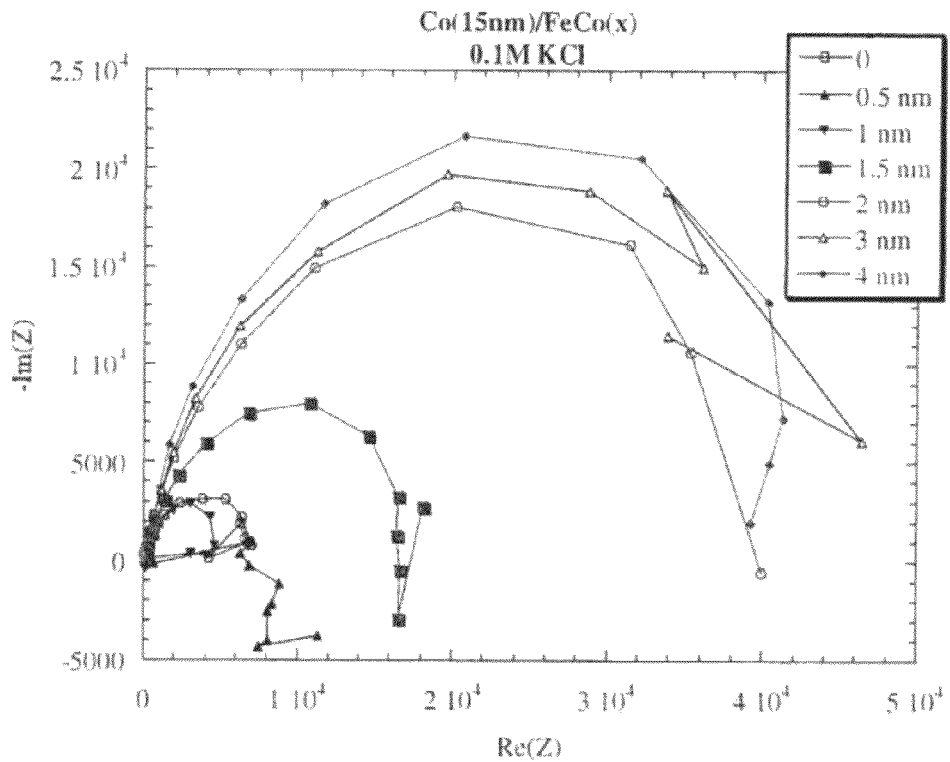
FIG. 5 are Nyquist impedance plots of EIS spectra of various $Fe_{50}Co_{50}$ films in 0.1 M KCl solution.

FIGS. 4 and 5 show data from electrochemical impedance spectroscopy (EIS) measurements performed on Co(15 nm)/FeCo(x nm) {x varies from 0.5 nm to 4 nm} structures exposed to ambient atmosphere for 3 days. The Bode and Nyquist plots can be used to interpret different characteristics of the system in question, namely the electrochemical nature of corrosion processes taking place in the Co substrate-FeCoOx overcoat structure. The zero thickness result is for a bare Co (15 nm) film that was also tested after exposure for 3 days. The surface oxide of Co definitely forms a layer with different electrochemical properties compared to $Fe_{50}Co_{50}$. The low frequency data in the Bode plot is an indicator of the corrosion resistance of thee system being tested. Anomalies in the 0.5 nm and 1 nm data suggest that these layers may not have been continuous. Some protection is offered by the 1.5 nm $Fe_{50}Co_{50}$ layer, while the protective properties seem to be optimized starting with the 2 nm sample. The Nyquist plot basically gives the same conclusions, except in this plot of the impedance, differences between the 2. 3 and 4 nm samples can be seen. In terms of actual corrosion protection, however, these differences may not be important.

Table 1 shows XPS results for thin $Fe_{50}Co_{50}$ layers grown on a Ni underlayer. Ni was used in this instance so that the NiO peaks in the XPS spectra could be differentiated from Fe oxide and Co oxide peaks. This test evaluated how well the FeCoOx layer was protecting the Ni layer from oxidation. The samples with 3 and 5 nm thick $Fe_{50}Co_{50}$ overcoat layers showed no detectable NiO. The sample with 1 nm $Fe_{50}Co_{50}$ showed some measurable NiO formation.

TABLE 1

Elemental Composition, expressed in atomic % of the top 50 Å of the surface.

| Sample | C | O | Co | Ni | Fe | Ni oxide (% of total) |
|---|---|---|---|---|---|---|
| Ni (for oxidation calibration) | 19 | 39 | — | 42 | — | 82 |
| Ni(200 Å)/FeCo(50 Å) coating | 26 | 50 | 7.0 | — | 17 | — |
| Ni(200 Å)/FeCo(30 Å) coating | 26 | 50 | 7.0 | 0.5 | 17 | — |
| Ni(200 Å)/FeCo(10 Å) coating | 32 | 44 | 5.7 | 4.6 | 14 | <5 |

Figure 6:
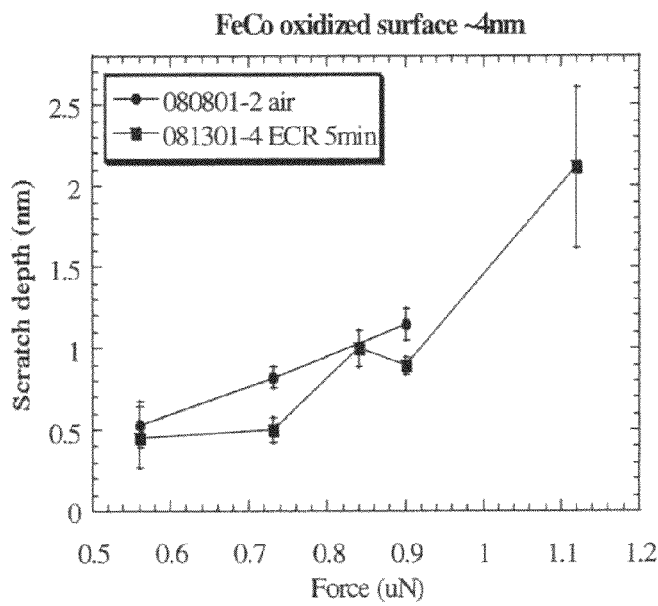
FIG. 6 shows nanoscratch results for $FeCoO_x$ films.
Figure 7:
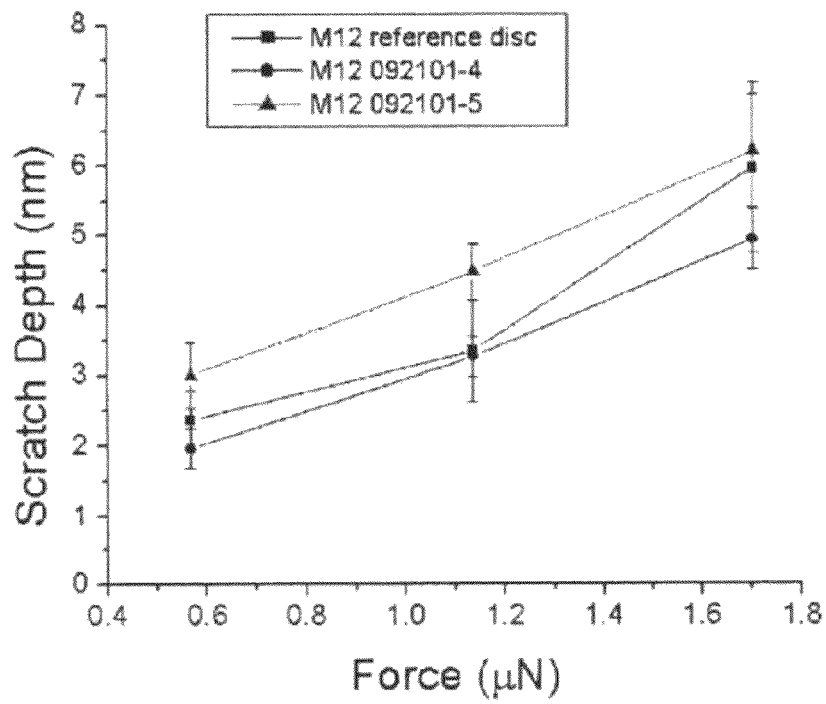
FIG. 7 shows nanoscratch results for media structures with carbon overcoats.

FIGS. 6 and 7 show the results of typical nano-indentation tests done on oxidized films of $Fe_{50}Co_{50}$ deposited directly onto Si wafers and media structures with sputtered carbon overcoats, respectively. The data on the carbon overcoats are shown for illustration only. Direct comparison is difficult as the effects of underlayers and substrate materials must be considered. Nevertheless, the FeCoOx films showed acceptable robustness during these tests. The different in hardness between the air exposed and ECR exposed oxide layers was negligible.

Example 2

Another alternative material for an overcoat layer is a cobalt doped titanium oxide ($Ti_{1-x}Co_xO$). A magnetic device including a cobalt doped titanium oxide overcoat layer was formed by co-sputtering cobalt and titanium oxide in a ratio of 70:30. The overcoat layer had a thickness of about 23 to 24 Å.

Various properties of the magnetic device with the cobalt doped titanium oxide overcoat layer were compared to a magnetic device having a diamond like carbon (DLC) overcoat layer with an underlying adhesion layer (AL), having a total thickness (DLC plus AL) of about 18 Å.

Figure 8:
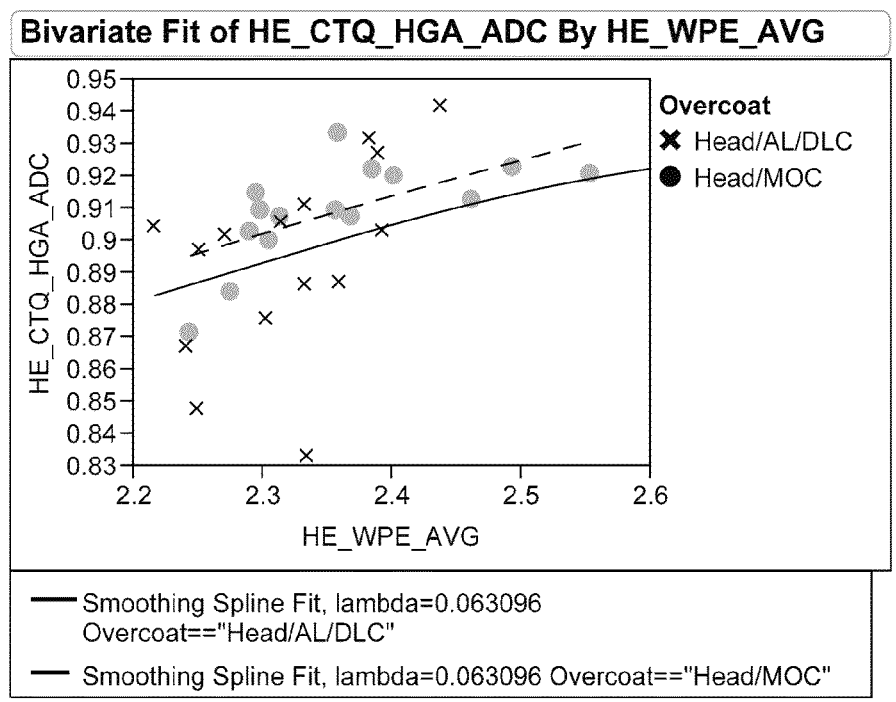
FIG. 8 shows the areal density capability, reported as a fraction of a target for both a device with a disclosed magnetic overcoat and a device including a prior art overcoat.
Figure 9:
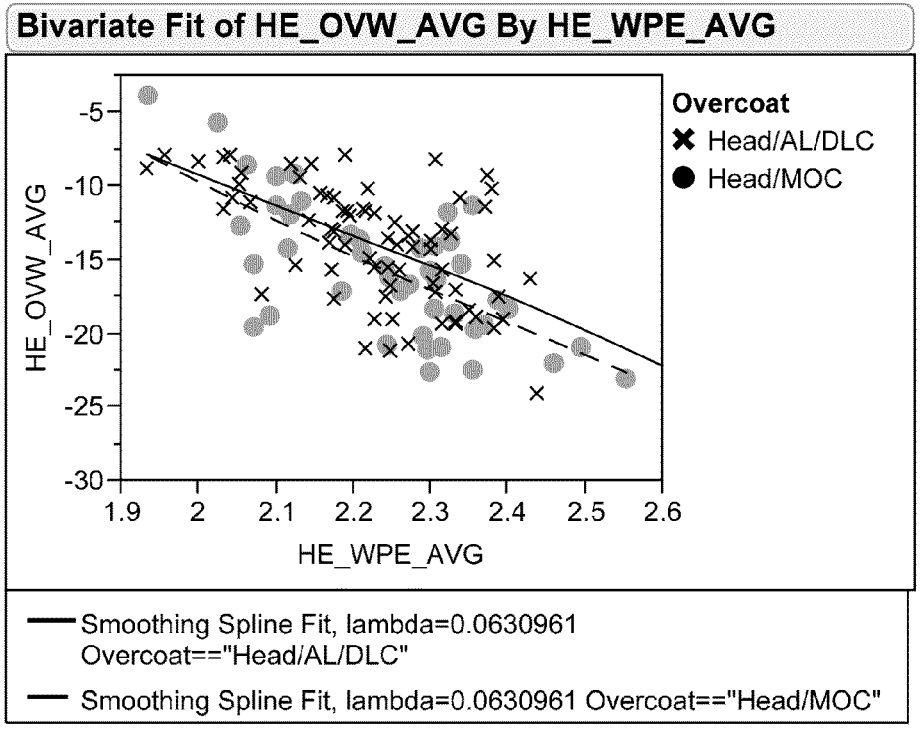
FIG. 9 shows the overwrite (OVW) as a function of write plus erase (WPE) for both a device with a disclosed magnetic overcoat and a device including a prior art overcoat.
Figure 10:
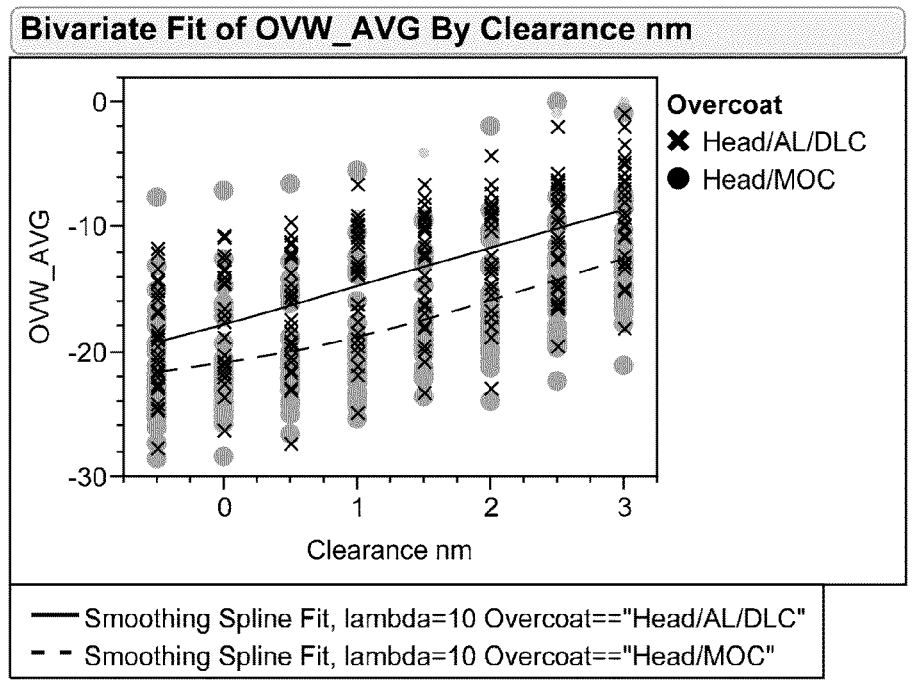
FIG. 10 shows the overwrite (OVW) as a function of clearance in nm for both a device with a disclosed magnetic overcoat and a device including a prior art overcoat.
Figure 11:
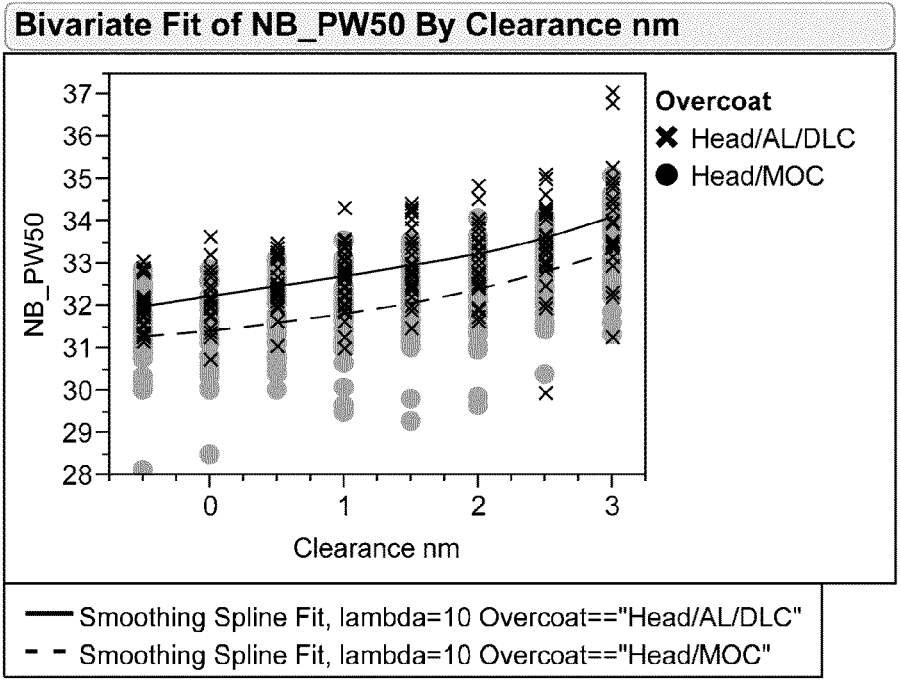
FIG. 11 shows the full width half max (PW50) of an isolated pulse readback as a function of clearance in nm for both a device with a disclosed magnetic overcoat and a device including a prior art overcoat.
Figure 12:
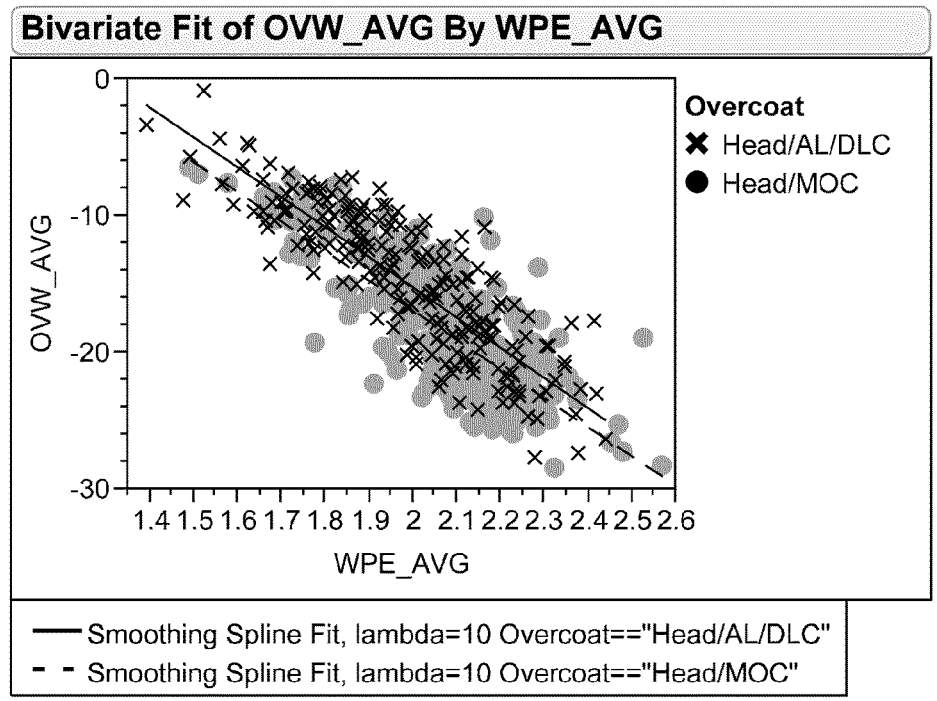
FIG. 12 shows the OVW as a function of WPE for both a device with a disclosed magnetic overcoat and a device including a prior art overcoat.

In FIGS. 8-12, the magnetic device with the cobalt doped titanium oxide overcoat layer is represented by "MOC", while the magnetic device with the adhesion layer and diamond like carbon is represented by "AL/DLC". FIG. 8 shows the areal density capability, reported as a fraction of a target for both the MOC and the AL/DLC devices. FIGS. 9 and 10 show the overwrite (OVW) as a function of write plus erase (WPE) and clearance in nm, respectively. WPE influences the other parametrics and is therefore used for normalization. FIG. 11 shows the full width half max (PW50) of an isolated pulse readback as a function of clearance in nm. FIG. 12 shows the OVW as a function of WPE. It should be noted that PW50 and OVW are both clearance sensitive, therefore, they are normalized to that metric. As seen in these figures, in all cases, there is an apparent improvement in metrics that correspond positively to reduced clearance. It should be noted that FIGS. 8 and 12 report the same thing from a different test bed.

Figure 13:
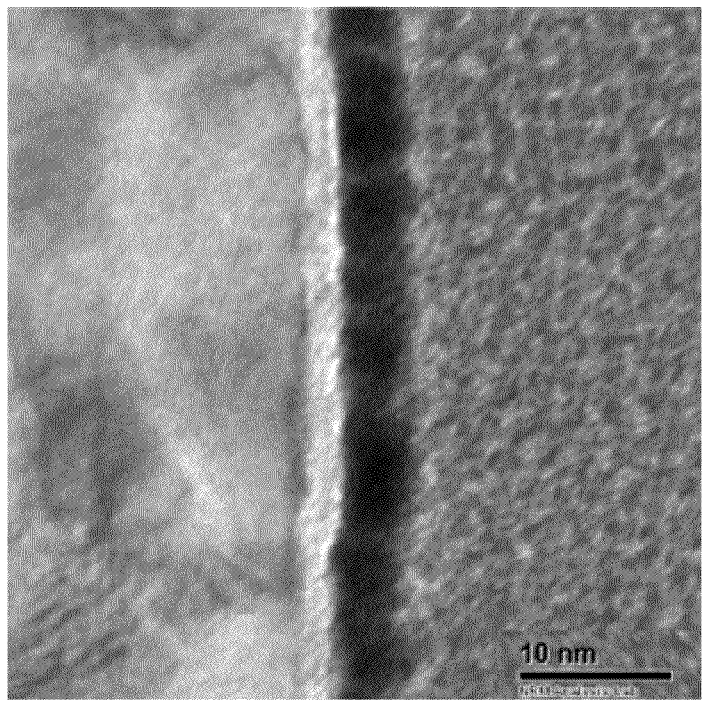
FIGS. 13 and 14 show TEM cross sections of exemplary overcoat layers.
Figure 14:
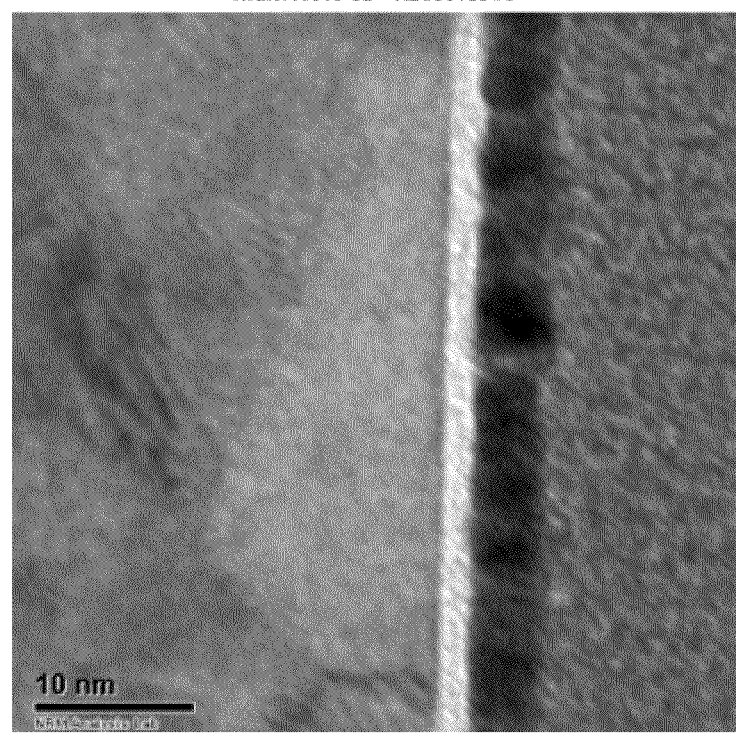

FIGS. 13 and 14 show cross section TEMs of the samples being compared. As can be seen, the improved metrics for the embodiments that include magnetic overcoats are not the result of having a thinner overcoat and therefore a reduced clearance.

Thus, embodiments of OVERCOATS THAT INCLUDE MAGNETIC MATERIALS are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. A device having an air bearing surface, the device comprising:
    a writer portion having an air bearing surface at the air bearing surface of the device; and
    an overcoat disposed on at least a portion of the air bearing surface of the writer portion, wherein the overcoat is exposed at the air bearing surface of the device, the overcoat has a thickness of not greater than about 25 Å, and the overcoat comprises a material having a magnetic moment of at least about 0.1 Tesla (T).

2. The device according to claim 1, wherein the overcoat is disposed on substantially all of the air bearing surface of the writer portion.

3. The device according to claim 1 further comprising a reader portion, wherein the overcoat is also disposed on at least a portion of the air bearing surface of the reader portion.

4. The device according to claim 1, wherein the overcoat comprises a material having a magnetic moment of at least about 0.5 Tesla (T).

5. The device according to claim 1, wherein the overcoat comprises a material having a magnetic moment of at least about 0.75 Tesla (T).

6. The device according to claim 1, wherein the overcoat comprises a material having a corrosion potential between about 0.0 to −0.1 V in an acidic solution.

7. The device according to claim 1, wherein the overcoat comprises a material having a corrosion potential greater than or equal to about −0.2 V in a neutral solution.

8. The device according to claim 1, wherein the overcoat comprises a material having a corrosion potential between about 0.0 to −0.1 V in an acidic solution and a corrosion potential greater than or equal to about −0.2 V in a neutral solution.

9. The device according to claim 1, wherein the overcoat comprises a material that is electrically insulating.

10. The device according to claim 9, wherein the overcoat comprises a material that has an electrical resistivity of at least about $6 \times 10^{-8}$ Ωm.

11. The device according to claim 1 further comprising a near field transducer.

12. The device according to claim 11, wherein the overcoat comprises a material that has a refractive index of at least about 2.09.

13. The device according to claim 1, wherein the overcoat comprises a material that has an extinction coefficient of about 0.

14. The device according to claim 1, wherein the material is chosen from mixtures of ferromagnetic material and insulating materials; semiconductors doped with magnetic materials; ferrites; two phase materials; atomic level bilayers or multilayers; graded layers of materials; or partially oxidized ferromagnetic materials or ferrimagnetic materials; and exotic materials.

15. A system comprising:
    a device having an air bearing surface, the device comprising:
        a writer portion having an air bearing surface at the air bearing surface of the device; and
        a head overcoat layer disposed on at least a portion of the air bearing surface of the writer portion, wherein the overcoat is exposed at the air bearing surface of the device, the overcoat has a thickness of not greater than about 25 Å, and the overcoat comprises a material having a magnetic moment of at least about 0.1 Tesla (T); and
    magnetic media, the magnetic media comprising a media overcoat layer, the media overcoat layer comprising a material having a magnetic moment of at least about 0.1 Tesla (T).

16. The system according to claim 15, wherein the head overcoat layer and the media overcoat layer comprise the same material.

17. The system according to claim 15, wherein both the head overcoat layer and the media overcoat layer independently comprise a material having a magnetic moment of at least about 0.5 Tesla (T).

18. The system according to claim 15, wherein both the head overcoat layer and the media overcoat layer independently comprise materials having a corrosion potential between about 0.0 to −0.1 V in an acidic solution.

19. The system according to claim 15, wherein both the head overcoat layer and the media overcoat layer independently comprise materials having corrosion potentials greater than or equal to about −0.2 V in a neutral solution.

20. The system according to claim 15, wherein both the head overcoat layer and the media overcoat layer independently comprise materials that have electrical resistivities of at least about $6 \times 10^{-8}$ Ωm.

21. The device according to claim 1, wherein the overcoat layer has a thickness from about 15 Å to about 25 Å.

* * * * *